(12) United States Patent
Wood et al.

(10) Patent No.: US 8,087,884 B2
(45) Date of Patent: *Jan. 3, 2012

(54) ADVANCED BOOSTER STATOR VANE

(75) Inventors: Peter John Wood, Loveland, OH (US);
Eric Andrew Falk, Middletown, OH (US); Lyle D. Dailey, Maineville, OH (US)

(73) Assignee: General Electric Company, Schenectady, NY (US)

( * ) Notice: Subject to any disclaimer, the term of this patent is extended or adjusted under 35 U.S.C. 154(b) by 768 days.

This patent is subject to a terminal disclaimer.

(21) Appl. No.: 11/606,728

(22) Filed: Nov. 30, 2006

(65) Prior Publication Data
US 2008/0131271 A1    Jun. 5, 2008

(51) Int. Cl.
*F01D 9/02* (2006.01)
(52) U.S. Cl. .................................. 415/191; 416/223 A
(58) Field of Classification Search .................. 415/191, 415/192; 416/223 A, 223 R, 235, 238, 242, 416/243, DIG. 2, DIG. 5
See application file for complete search history.

(56) References Cited

U.S. PATENT DOCUMENTS

| | | | |
|---|---|---|---|
| 2,663,493 A | 12/1953 | Keast | |
| 2,746,672 A | 5/1956 | Doll, Jr et al. | |
| 4,358,246 A * | 11/1982 | Hanson et al. | 416/223 R |
| 4,504,189 A * | 3/1985 | Lings | 415/115 |
| 5,167,489 A | 12/1992 | Wadia et al. | |
| 5,211,533 A | 5/1993 | Walker et al. | |
| 5,342,170 A | 8/1994 | Elvekjaer et al. | |
| 6,071,077 A | 6/2000 | Rowlands | |
| 6,077,036 A * | 6/2000 | Heffron et al. | 415/115 |
| 6,290,465 B1 * | 9/2001 | Lammas et al. | 416/223 A |
| 6,299,412 B1 | 10/2001 | Wood et al. | |
| 6,312,219 B1 | 11/2001 | Wood et al. | |
| 6,328,533 B1 | 12/2001 | Decker et al. | |
| 6,331,100 B1 | 12/2001 | Liu et al. | |
| 6,345,955 B1 * | 2/2002 | Heffron et al. | 415/115 |
| 6,428,281 B1 | 8/2002 | Botrel et al. | |
| 6,508,630 B2 | 1/2003 | Liu et al. | |
| RE38,040 E | 3/2003 | Spear et al. | |
| 6,755,612 B2 * | 6/2004 | Shahpar et al. | 415/192 |
| 6,899,526 B2 * | 5/2005 | Doloresco et al. | 416/238 |
| 7,121,792 B1 | 10/2006 | Fessou et al. | |
| 7,204,676 B2 * | 4/2007 | Dutton et al. | 416/238 |
| 2002/0141863 A1 | 10/2002 | Liu et al. | |

(Continued)

FOREIGN PATENT DOCUMENTS

DE    1903642 A1    8/1970

(Continued)

OTHER PUBLICATIONS

Sep. 1963, Smith, Jr. et al., "Sweep and Dihedral Effects in Axial-Flow Turbo-Machinery", Journal of Basic Engineer, pp. 401-416.
European Search Report issued in connection with application EP 07121586.7, Feb. 9, 2010.
European Search Report issued in connection with application EP 07121586.7, Apr. 28, 2010.
European Search Report issued in connection with application EP 07121585.9, Feb. 9, 2010.

(Continued)

*Primary Examiner* — Edward Look
*Assistant Examiner* — Sean J Younger
(74) *Attorney, Agent, or Firm* — David J. Clement; William Scott Andes; General Electric Company

(57) ABSTRACT

A stator vane includes leading and trailing edges extending longitudinally between a root and a tip, the trailing edge having an exit swirl angle distribution such that the exit swirl angle has a maximum value at an intermediate radius location.

8 Claims, 12 Drawing Sheets

U.S. PATENT DOCUMENTS

2004/0091353 A1  5/2004  Shahpar et al.
2008/0131272 A1  6/2008  Wood et al.

FOREIGN PATENT DOCUMENTS

| EP | 0251978 A2 | 1/1988 |
| EP | 0441097 A1 | 8/1991 |
| EP | 0774567 A1 | 5/1997 |
| EP | 0801230 A2 | 10/1997 |
| EP | 1505302 A1 | 2/2005 |
| GB | 2151310 A  | 7/1985 |

OTHER PUBLICATIONS

European Search Report issued in connection with application EP 07121585.9, Apr. 28, 2010.
European Search Report issued in connection with application EP 07121584.2, Feb. 9, 2010.
European Search Report issued in connection with application EP 07121584.2, Apr. 29, 2010.
U.S. Appl. No. 11/606,766, filed Nov. 30, 2006.

* cited by examiner

ADVANCED BOOSTER STATOR VANE

CROSS REFERENCE TO RELATED APPLICATIONS

This specification is related to and incorporates herein by reference U.S. application Ser. No. 11/606,766, entitled "ADVANCED BOOSTER ROTOR BLADE", and U.S. application Ser. No. 11/606,759, entitled "ADVANCED BOOSTER SYSTEM", which were filed concurrently with this application.

BACKGROUND OF THE INVENTION

This invention relates generally to gas turbine engines, and, more specifically, to the compression modules therein, such as the booster and the compressor.

In a turbofan aircraft gas turbine engine, air is pressurized in a fan module and a compression module during operation. The air passing through the fan module is used for generating the bulk of the thrust needed for propelling an aircraft in flight. The air channeled through the compression module is mixed with fuel in a combustor and ignited, generating hot combustion gases which flow through turbine stages that extract energy therefrom for powering the fan and compressor rotors.

A typical compression module in a turbofan engine includes a multi stage booster which compresses the air to an intermediate pressure and passes it to a multistage axial flow compressor which further pressurizes the air sequentially to produce high pressure air for combustion. Both the booster and the compressor have rotor stages and stator stages. The booster rotor is typically driven by a low pressure turbine and the compressor rotor is driven by a high pressure turbine.

Fundamental in booster and compressor design is efficiency in compressing the air with sufficient stall margin over the entire flight envelope of operation from takeoff, cruise, and landing. However, compressor efficiency and stall margin are normally inversely related with increasing efficiency typically corresponding with a decrease in stall margin. The conflicting requirements of stall margin and efficiency are particularly demanding in high performance jet engines that require increased power extraction, while still requiring high a level of stall margin in conjunction with high compressor efficiency. In conventional designs, efficiency is usually sacrificed in order to achieve improved operability and increased stall margin.

Operability of a compression system in a gas turbine engine is traditionally represented on an operating map with inlet corrected flow rate along the X-axis and the pressure ratio on the Y-axis, such as for example, shown in FIG. 1 for a booster. In FIG. 1, operating line 102 and the stall line 101 are shown, along with several constant speed lines 104-108. Line 104 represents a lower speed line and line 105 represents a higher speed line as compared to the design speed line 103. As the booster is throttled from the operating line 102 at a constant speed, such as the design speed represented by the constant speed line 103, the inlet corrected flow rate decreases while the pressure ratio increases, and the booster operation moves closer to the stall line 101. In order to avoid a stall, the fans, boosters and compressors in a gas turbine engine are designed to have sufficient stall margin with respect to the stall line, such as line 101 shown in FIG. 1.

Maximizing efficiency of booster and compressor airfoils is primarily effected by optimizing the velocity distributions over the pressure and suction sides of the airfoil. However, efficiency is typically limited in conventional booster and compressor designs by the requirement for a suitable stall margin. Any further increase in efficiency results in a reduction in stall margin, and, conversely, further increase in stall margin results in decrease in efficiency.

High efficiency is typically obtained by minimizing the wetted surface area of the airfoils for a given stage to correspondingly reduce airfoil drag. This is typically achieved by reducing airfoil solidity or the density of airfoils around the circumference of a rotor disk, or by increasing airfoil aspect ratio of the chord to span lengths.

For a given rotor speed, this increase in efficiency reduces stall margin. To achieve high levels of stall margin, a higher than optimum level of solidity may be used, along with designing the airfoils at below optimum incidence angles. This reduces axial flow compressor efficiency.

Increased stall margin may also be obtained by increasing rotor speed, but this in turn reduces efficiency by increasing the airfoil Mach numbers, which increases airfoil drag. Obtaining adequate stall margin is a problem especially in the case of the booster. Boosters typically are run at relatively lower wheel-speeds, while at the same time, the throughflow velocity of the air is high. The booster is also unique in geometry because the air flowing through the rear stages of the booster is subjected to a significant change in direction of flow radially inward towards the longitudinal centerline axis. This results in a radial incidence swing imbalance as the booster is throttled to stall with large incidence swings in the hub region of the airfoils. In the booster, across the cruise and high power operating range where the booster bleed valve is closed, stall typically initiates in the hub region first, and therefore the incidence swings in the hub region are particularly detrimental to operability. The incidence swings in the hub region and the resulting stall margin loss become even more severe during engine operation when there is increased demand for auxiliary electric power from the high pressure spool in the engine. In conventional designs, efficiency is typically compromised to meet operability requirements.

It is, therefore, desired to further improve the stall margin of the boosters and other high through-flow/wheel-speed compressors without significantly sacrificing the efficiency for improving gas turbine engine booster and compressor performance.

BRIEF DESCRIPTION OF THE INVENTION

A stator vane includes leading and trailing edges extending longitudinally between a root and a tip, the trailing edge having an exit swirl angle distribution such that the exit swirl angle has a maximum value at an intermediate radius location.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

While the invention has been described in terms of various specific embodiments, those skilled in the art will recognize that the invention can be practiced with modification within the spirit and scope of the claims.

Figure 2:
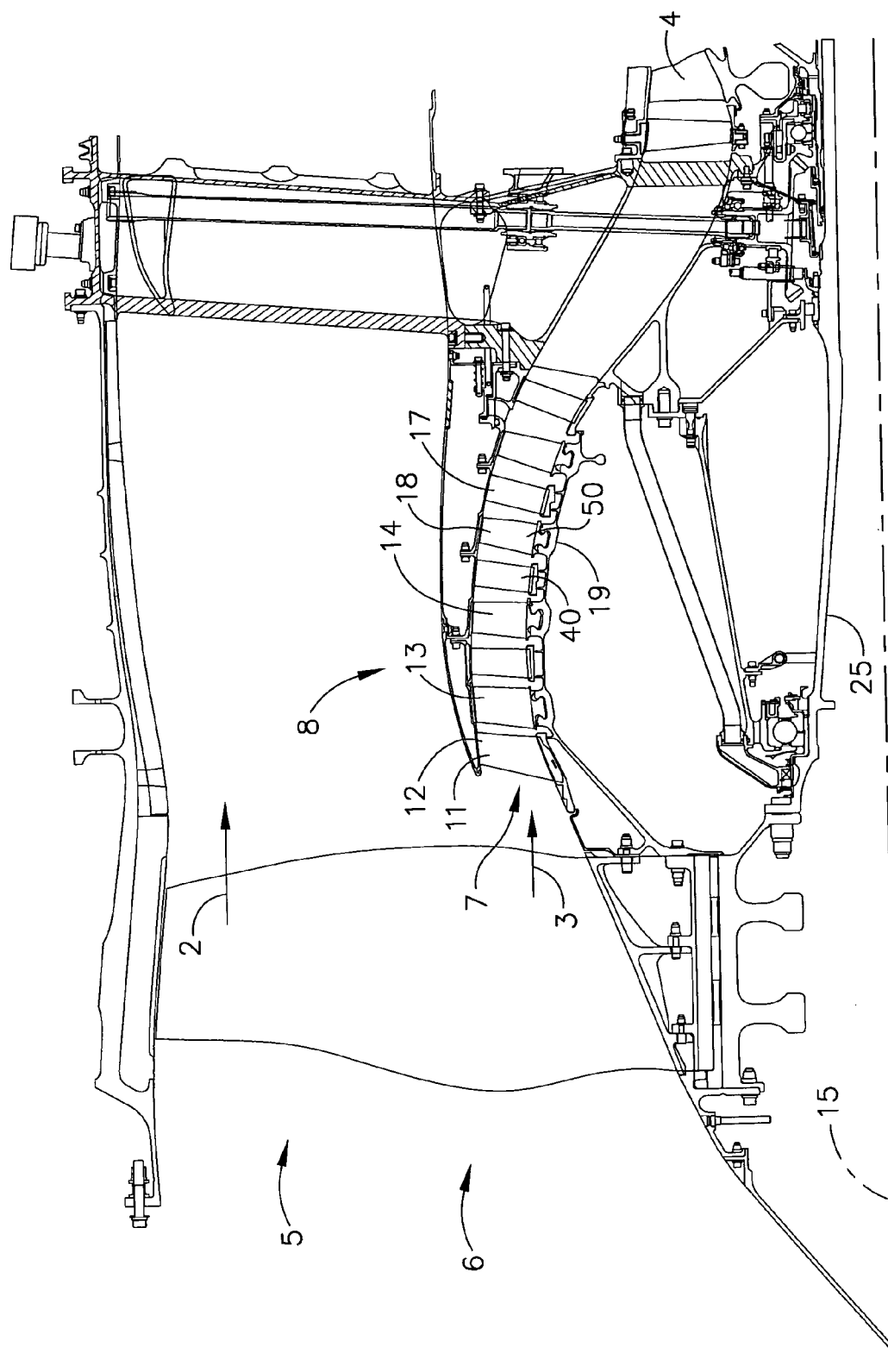
FIG. 2 is an axial sectional view through a portion of a gas turbine engine fan and booster.

Illustrated in FIG. 2 is a portion of a gas turbine engine fan 5 and booster 7 configured for channeling and pressurizing a bypass airflow 2 and a core airflow 3 respectively. The booster 7, which pressurizes the air flowing through the core, is axisymmetrical about a longitudinal centerline axis 15, and includes an inlet guide vane (IGV) stage 11 having a plurality of inlet guide vanes 12 spaced in a circumferential direction around the longitudinal centerline axis 15, a plurality of stator vane stages 17. The booster 7 further includes multiple rotor stages 18 which have corresponding rotor blades 50 extending radially outwardly from a rotor hub 19 or corresponding rotors in the form of separate disks, or integral blisks, or annular drums in any conventional manner.

Figure 4:
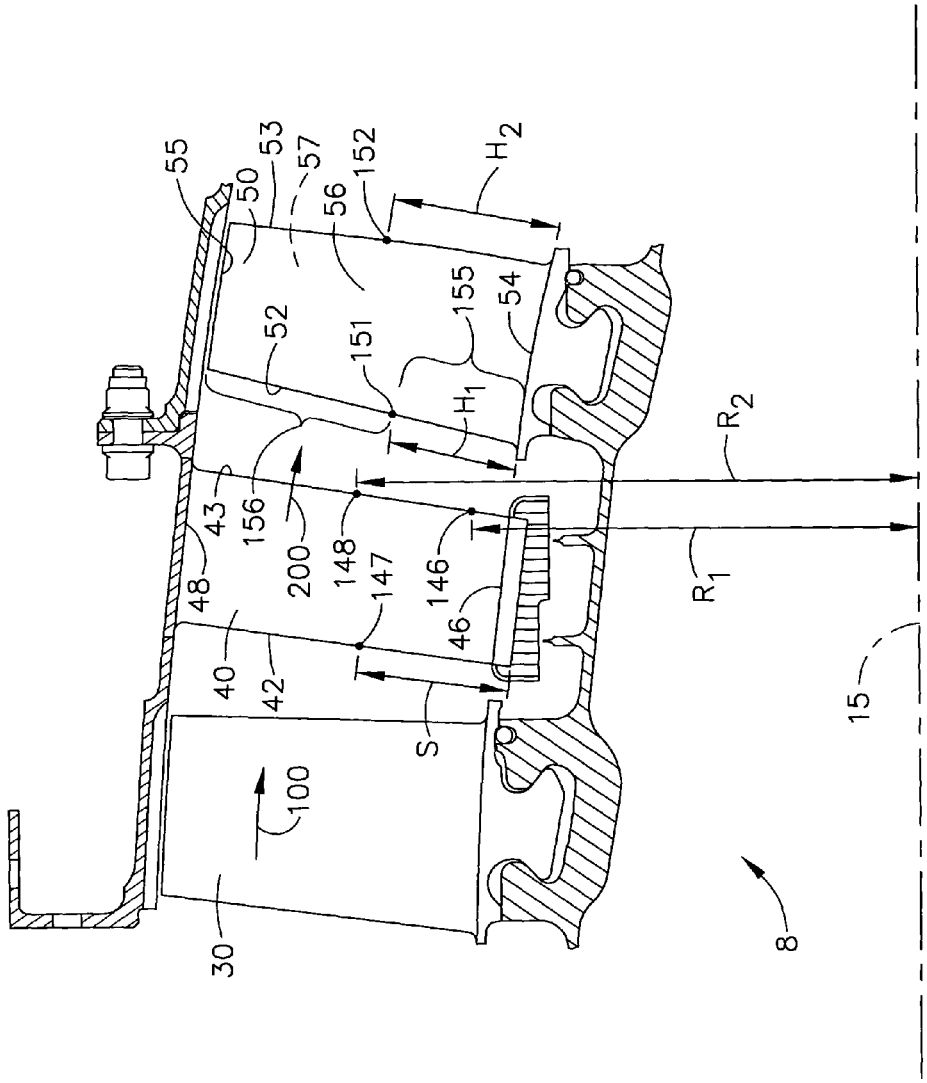
FIG. 4 is an axial view of a part of the booster rotor and stator stages showing a stator vane and corresponding rotor blades.

Cooperating with each rotor stage, such as for example, the rotor stage 18, is a corresponding stator stage 17. Each stator stage 17 in the booster 7 comprises a plurality of circumferentially spaced apart stator vanes 40. The arrangement of stator vanes and rotor blades is shown in FIG. 4. The rotor blades 50 and stator vanes 40 define airfoils having corresponding aerodynamic profiles or contours for pressurizing the core air flow 3 successively in axial stages. In operation, pressure of the air is increased as the air decelerates and diffuses through the stator and rotor airfoils.

Figure 5:
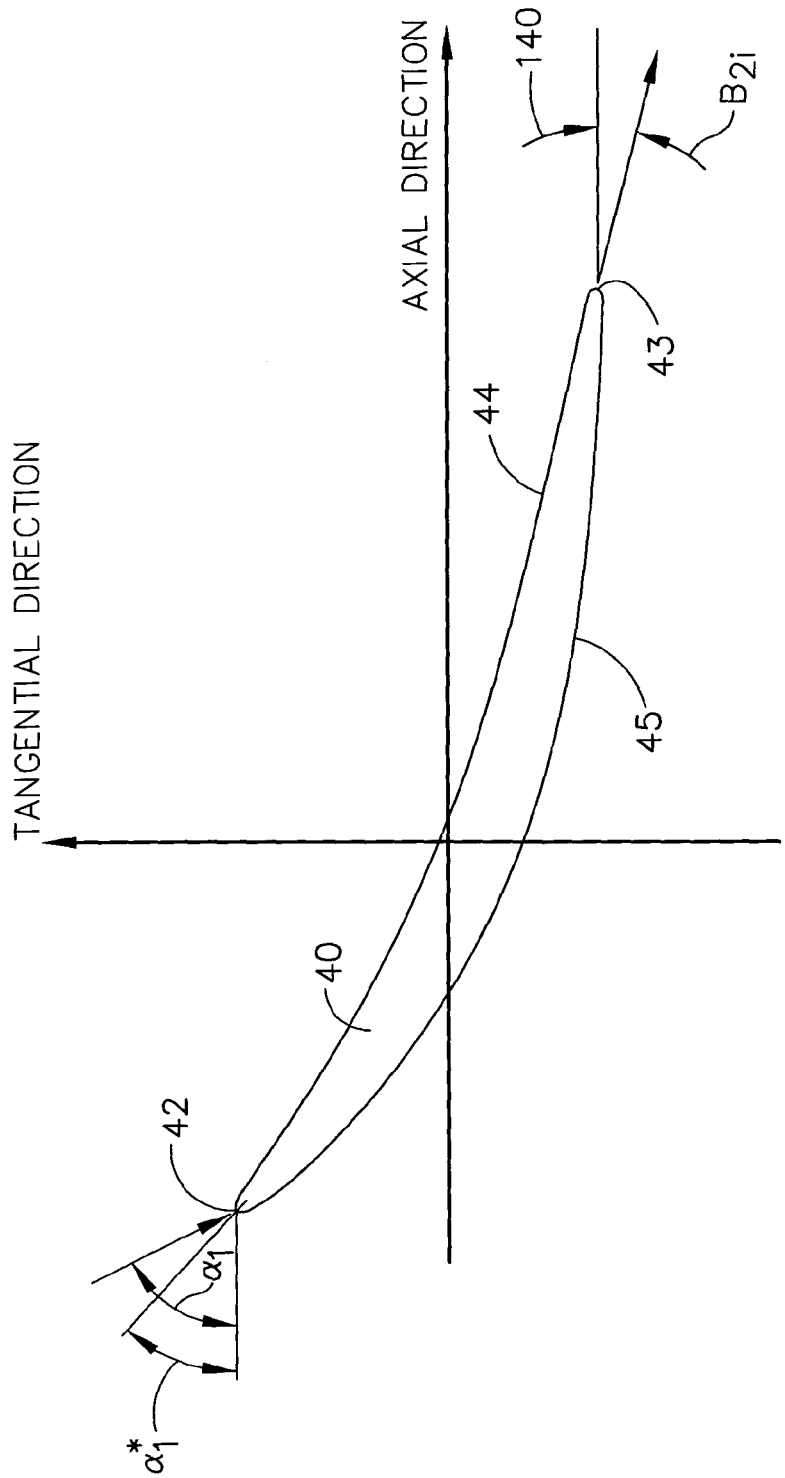
FIG. 5 is a radial sectional view through the airfoil of one of the stator vanes in a booster.

FIG. 5 shows an exemplary radial sectional of the stator vane airfoil in a two dimensional axial plane view. As shown in FIG. 5, each stator vane 40 defines an airfoil including a generally concave pressure side 44 and a circumferentially opposite, generally convex suction side 45. The two sides 44,45 extend chordally between an upstream leading edge 42 and an axially opposite, downstream trailing edge 43. The booster is a high "throughflow-velocity/wheel speed" design, wherein it is driven by low pressure turbines with relatively lower speeds, while the axial air flow velocity through the booster is relatively high. Additionally, the hub flow pathway though the booster turns radially inward towards the engine centerline. This causes the radial incidence angle to the airfoils to undergo large variations, especially in the hub region, as the booster operates in various flight regimes with varying demands on airflow. This is undesirable because stall in a booster may typically originate near the hub region of the airfoils. In conventional designs, in order to achieve operability goals in the presence of the high radial incidence angle swing imbalance, efficiency is typically sacrificed. It is desirable to have a booster design where the requirements for the stall margin, including auxiliary electric power extraction, can be achieved without sacrificing the efficiency.

Figure 6:
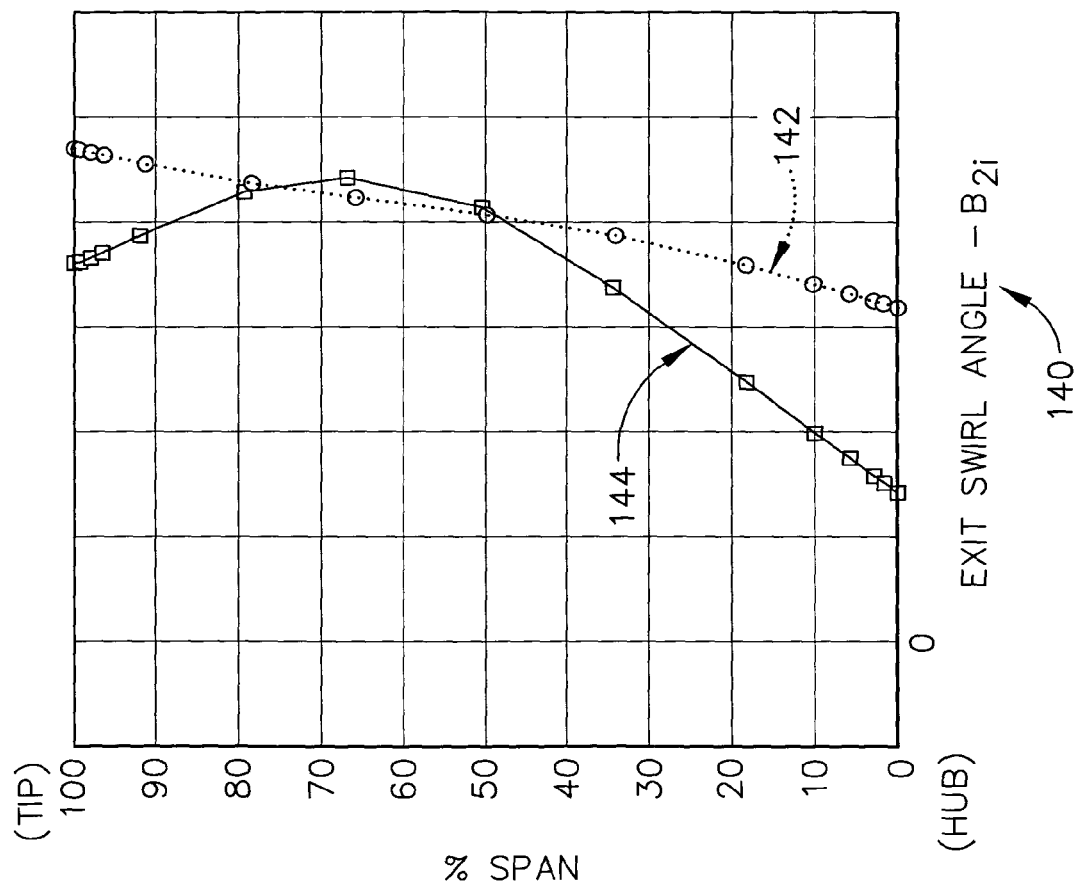
FIG. 6 is a comparison of an exemplary exit swirl angle distribution for a stator vane in accordance with an exemplary embodiment of the present invention with a conventional exit swirl angle distribution.

One way of accomplishing this is by utilizing stator vanes 40 and rotor blades 50 designed to reduce incidence angle swings in the hub regions of the booster system during operation. Incidence angle for a rotor blade is defined as the difference between the relative inlet air angle 306 measured from the meridional direction ($\beta 1$, see FIG. 10) and the inlet metal angle 305 determined by the camber line angle at the leading edge measured from the meridional direction ($\beta 1^*$, see FIG. 10). "Delta incidence" ($\Delta$INCIDENCE) is the difference between the incidence angle at stall line 101 and the incidence angle on the operating line 102. For stator vanes the same definitions for incidence angle and "Delta incidence" apply, except that the air angle is measured from the meridional direction in the absolute frame of reference. An exemplary stator vane 40 reduces the incidence flow swing in the booster hub region by using a trailing edge 43 having a particular exit swirl angle profile. An exemplary exit swirl angle distribution 144 for the exemplary stator vane 40 is shown in FIG. 6. FIG. 6 is a plot of the exit swirl angle versus the percent-span. The incidence angle swing in hub region of the rotor blades and stator vanes of the booster is reduced by adopting a trailing edge 43 with a particular distribution for the exit swirl angle 140 from the root 46 to the tip 48, where the exit swirl angle is defined as the air angle leaving the stator trailing edge measured from the meridional direction omitting any secondary flow effects (shown in a 2D axial plane view in FIG. 5). Conventional design stator vanes typically result in an approximately linear and monotonically increasing swirl angle distribution, such as the distribution 142 in FIG. 6. In the exemplary design of the stator vane 40 shown in FIG. 4, the vane has a tailored exit swirl angle distribution profile such as, for example item 144 shown in FIG. 6, from the root 46 to the tip 48 of the stator vane 40 such that the exit swirl angle 140 has a maximum value at an intermediate radius location 148 between a first radius location 146 and the tip 48.

In a preferred embodiment of the exemplary stator vane 40, the maximum value for the exit swirl angle (about 22 degrees) in the trailing edge 43 occurs at a span location of about 70% span height from the root, with the lowest value of the exit swirl angle (about 7 degrees) occurring at the root 46 of the trailing edge 43 and the tip 48 has an exit swirl angle (about 18 degrees) in between the root value and the peak value. The incidence swing near the hub region of the booster is significantly reduced as compared to a conventional vane resulting in increased stall margin and improved efficiency for the booster.

Figure 7:
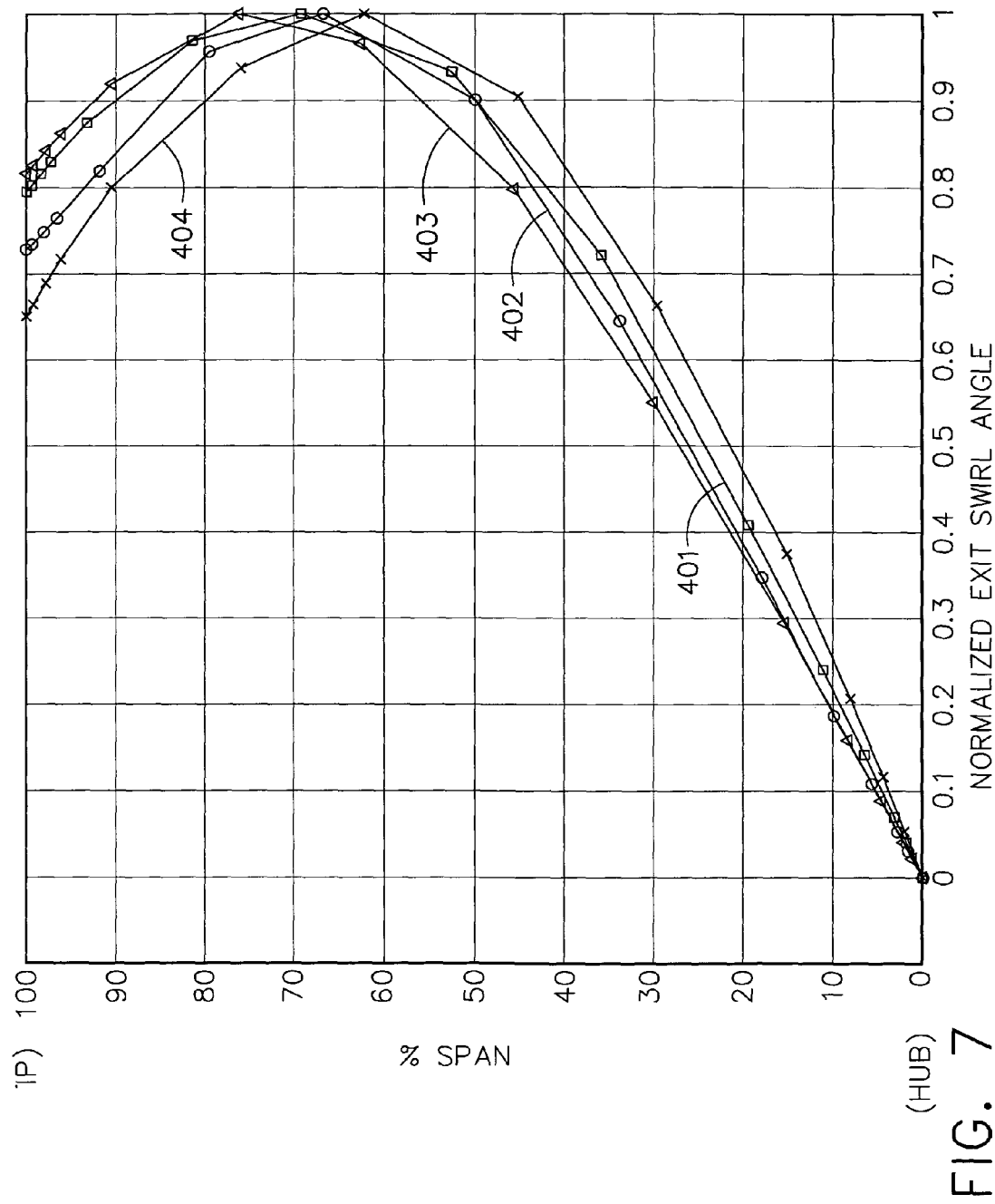
FIG. 7 is a plot of a set of exemplary exit swirl angle distributions, in normalized form, for the various stages of an exemplary booster system.

Stall margins for different rotor/stator stages can be improved by suitably designing the stator vane airfoils with trailing edge exit swirl angle distributions similar to the one shown in FIG. 6 item 144. The location of the peak value of trailing edge exit swirl angle 140 could be chosen to be at 50% span or higher, preferably in the 60% to 80% span range, with the lowest value occurring near the root 46 of the stator vane 40. The trailing edge exit swirl angle distributions for the various stator stages of a preferred embodiment of a booster system are shown in FIG. 7 on a non-dimensional basis, where the exit swirl angle at the tip 48 has been reduced to a level that is in the range of 65% to 85% of the exit swirl angle difference between the maximum value along the span and the minimum value at the root 46.

In another embodiment of the new stator vane 40 described above, the leading edge 42 of the stator vane 40 is designed with a sweep angle profile. Aerodynamic sweep is a conventional parameter represented by a local sweep angle which is a function of the direction of the incoming air and the orientation of the airfoil surface in both the axial, and circumferential or tangential directions. The sweep angle is defined in detail in the U.S. Pat. No. 5,167,489, and is incorporated herein by reference. In the sign convention used herein, the aerodynamic sweep angle is represented as a negative value (−) for forward sweep, and a positive value (+) for aft sweep. In another embodiment of the stator vane 40 with tailored exit swirl angle distribution as described previously, the stator vane leading edge 42 is designed with a forward sweep near the root 46 of the airfoil in the hub region of the booster. This combination of a stator vane leading edge 42 with a forward sweep near the root of the airfoil in the hub region of the booster and a trailing edge 43 with specific trailing edge exit swirl angle distribution further improves the aerodynamic performance and operability of the booster.

Figure 8:
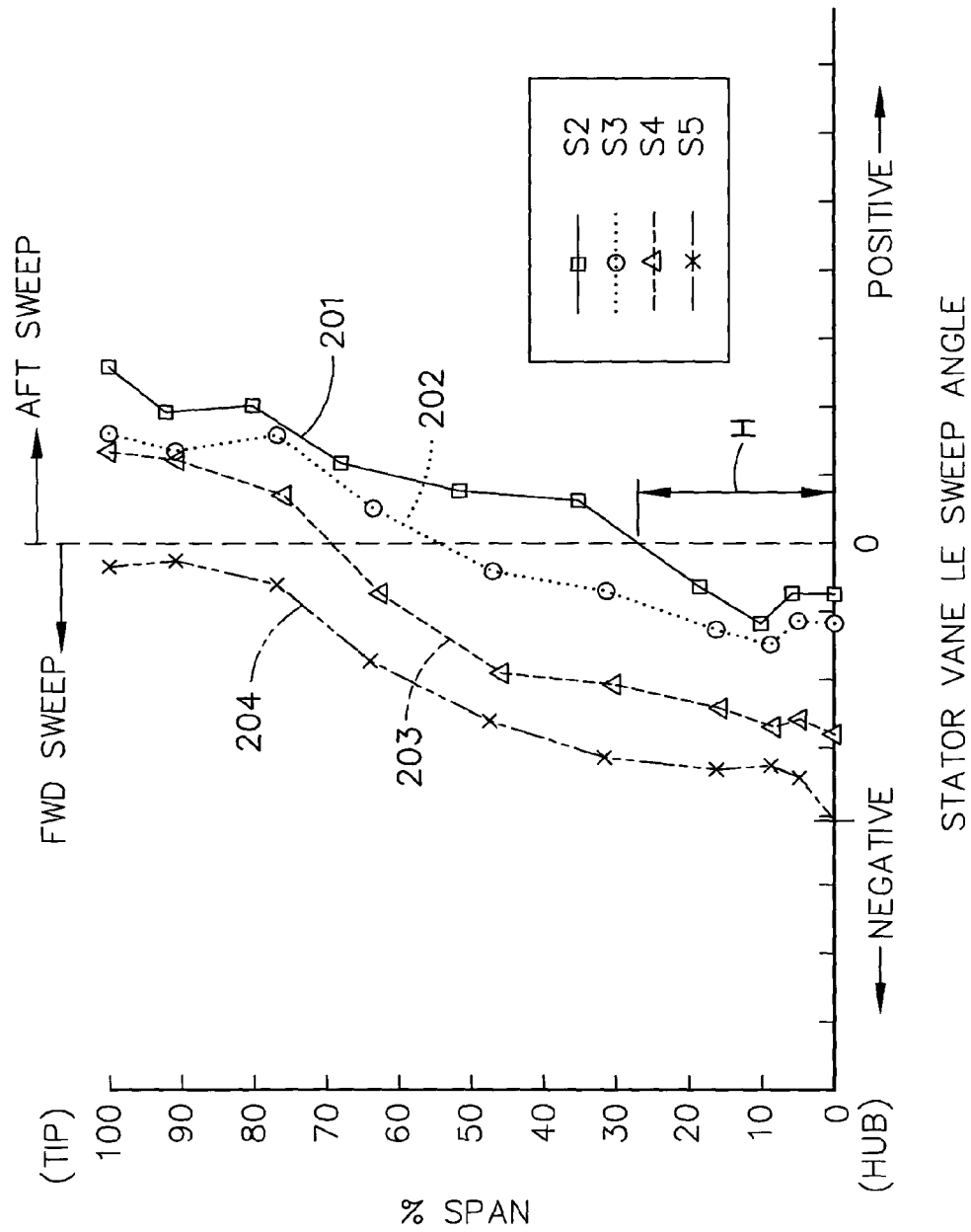
FIG. 8 is an exemplary embodiment of stator leading edge sweep angle variations with span height for multiple stator stages of a booster.

FIG. 8 shows exemplary stator vane leading edge sweep angle distributions along the span for the various stator stages of an exemplary multistage booster. In the preferred embodiment for a multi stage booster, the sweep angle is negative between the root 46 and a first span location 147 in FIG. 4 and is positive from the first span location 147 to the tip 48. The span height from the root 46 at which the sweep angle changes from negative to positive (denoted by "H" in FIG. 8) in a stator vane 40 is a function of the axial location of the particular stator vane stage. As the air travels axially within the booster from the entrance to the exit, it has to undergo sharp turns towards the longitudinal centerline axis 15 of the booster prior to entry into a compressor located downstream. In the exemplary embodiment of a booster system 7, the stator vane leading edge sweep angle distributions, as shown in FIG. 8, are such that the span height from the root 46 at which the sweep angle changes from negative to positive is higher for stator stages located further aft in the booster system. It is possible that one or more of the stator stages at the aft end of the booster may have stator vanes with leading edges that have a forward sweep only along the entire span. In FIG. 8, for example, the stator stage denoted by "S5" is such a stage.

In the preferred embodiment of the booster system 7, the span location from the root 46 at which the leading edge sweep angle changes from negative to positive is about 25% for a forward stage (denoted by "S2" in FIG. 8), 50% for an intermediate stage (denoted by "S3" in FIG. 8) and 70% for a rear stage (denoted by "S3" in FIG. 8) while the aft-most stage (denoted by "S5" in FIG. 8) has no leading edge aft sweep. In the preferred embodiment of the booster system 7, all the stator stages have stator vanes 40 such that the leading edge forward sweep at the root 46 for a stator vane 40 is larger for stator stages located further aft in the booster system and the stator vanes 40 have tips 48 having less leading edge forward sweep, or more aft sweep, than at the root 46. In the preferred embodiment of the booster system 7, the stator vane leading edge sweep angle at the root 46 is about −3 degrees for the forward-most stage, about −5 degrees for the next stage aft, about −15 degrees for the rear stage and about −20 degrees for the rear-most stage. The stator vane 40 leading edge 42 sweep angle at the tip 48 is about 13 degrees for the forward-most stage, about 7 degrees for the next stage aft, about 5 degrees for the rear stage and about −2 degrees for the rear-most stage.

Figure 3:
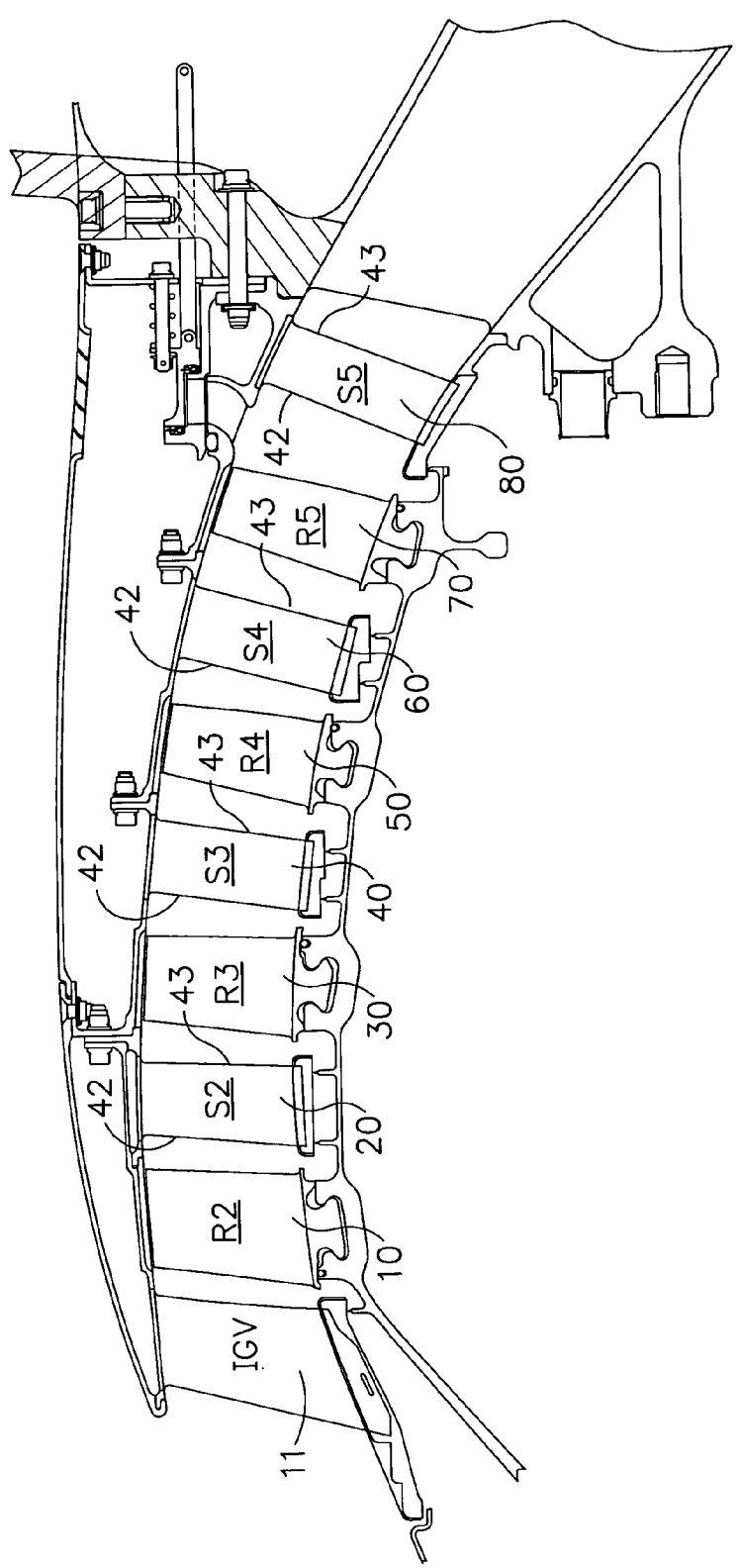
FIG. 3 is an axial sectional view through a booster including rotor stages disposed axially between corresponding stator stages in accordance with an exemplary embodiment of the present invention.

As illustrated in FIG. 2, the booster system 7 in a gas turbine engine comprises multiple rotor stages 18, with each rotor stage having multiple rotor blades. These rotor blades for the various rotor stages are shown in FIG. 3, for example, as item 10 for a stage 2 rotor, item 30 for a stage 3 rotor, item 50 for a stage 4 rotor, and item 70, for a stage 5 rotor. As shown in FIG. 3, the first booster rotor stage (marked as "R2") is located immediately aft of the inlet guide vane stage (marked as "IGV"). Each of the other rotor stages, R3-R5, is associated with the stator stages axially forward and aft from it, with each stator stage having multiple stator vanes. These stator vanes for the various stator stages are shown in FIG. 3, for example, as item 20 for stator stage 2, item 40 for stator stage 3, item 60 for stator stage 4 and item 80 for stator stage 5. Air exiting from a stator stage enters the downstream adjacent rotor stage and is further compressed by the rotor blades in the rotor stage. As described in detail before, the stator vanes in a stator stage are designed to have specific trailing edge and leading edge characteristics to improve the operability and efficiency of the booster. The operability and efficiency are also influenced by the mechanical and aerodynamic design of the rotor blades in the booster. Stall margins and efficiency of a compression stage and the booster system can be enhanced by adopting the specific design characteristics for the rotor blades as disclosed and described herein.

Figure 1:
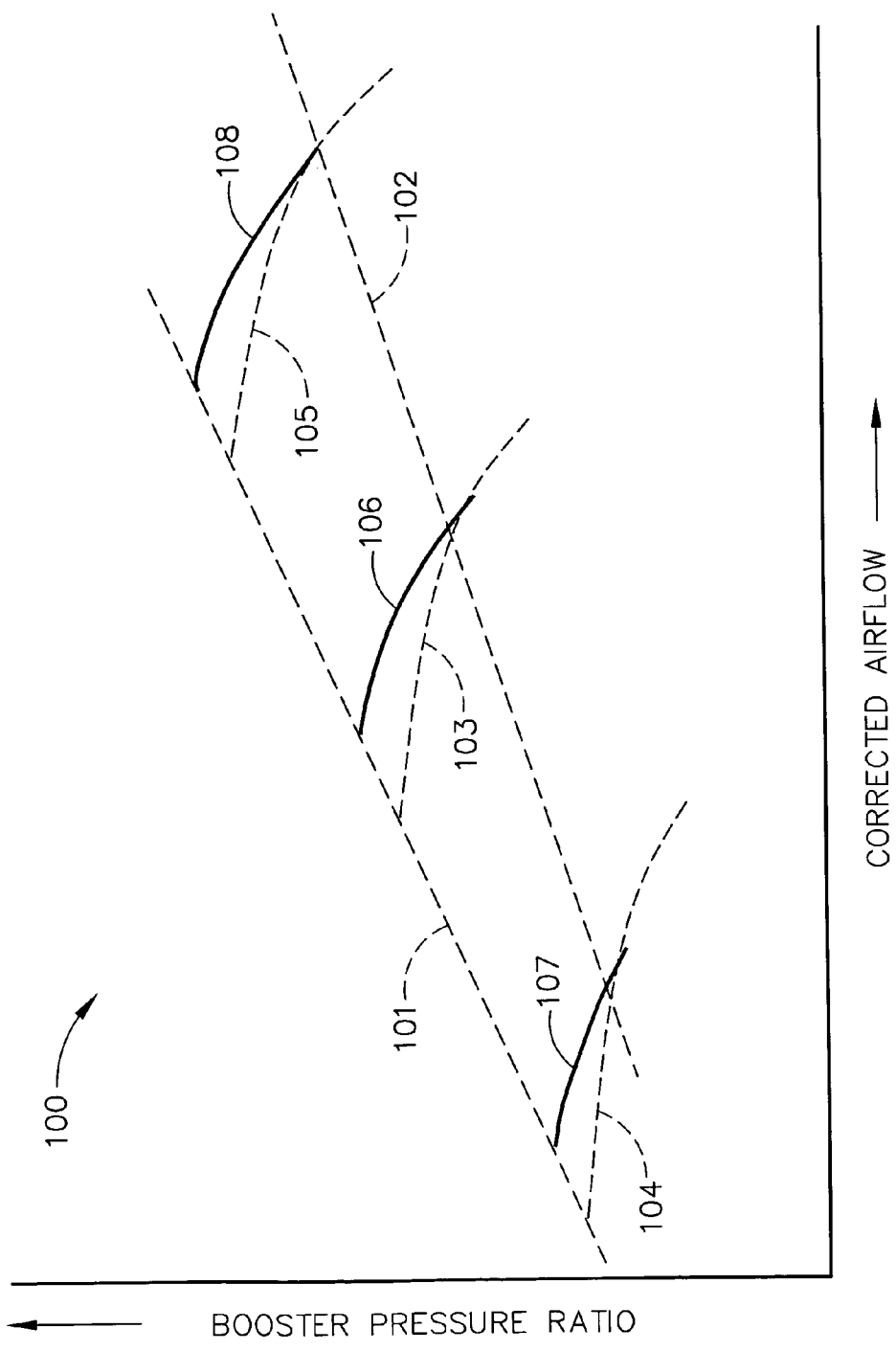
FIG. 1 is an example of the operating map of a booster, showing operating line, stall line and the speed lines.

The reduced incidence swing in the hubs of the airfoils results in a steeper speedline shape. Such steeper speedlines are shown in FIG. 1 (items 106, 107 and 108).

Blade sweep has been used in fan and compressor blade designs for various reasons such as noise reduction and performance improvement. In one embodiment of the present invention of a new rotor blade 50, the blade leading edge 52 has a new sweep profile such that in the rate of change of leading edge sweep angle with respect to the span height has a substantially constant value along most of the leading edge span. In another embodiment, the leading edge sweep angle has a first rate of change with respect to the span height that is substantially constant near the blade root 54, in a blade inner span region 155, and has a second rate of change with respect to span height that is substantially constant along the span up to the blade tip 55 in a blade outer span region 156. In the preferred embodiment of the blade, the blade inner span region 155 covers a span of about 10% span height measured from the blade root 54. In another embodiment of the invention, the rate of change of the leading edge sweep angle with respect to the span height is substantially constant along the entire blade leading edge 52.

Figure 9:
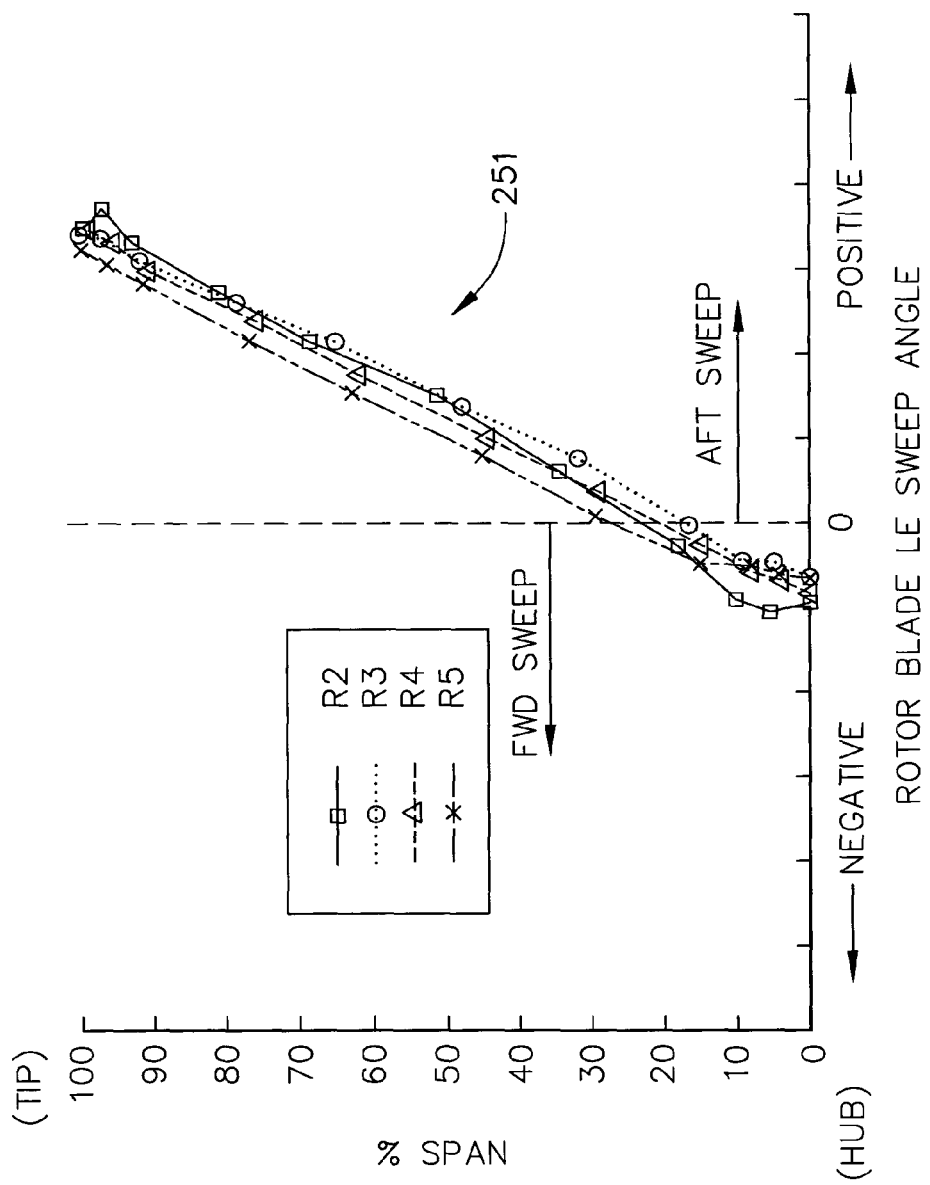
FIG. 9 is an exemplary embodiment of rotor leading edge sweep angle variations with span height for multiple rotor stages of a booster.

FIG. 9 shows an exemplary variation of the leading edge sweep angle along the span height that is contemplated by the present invention. As shown in FIG. 9, the blade leading edge 52 has a forward sweep (negative sweep angle) near the root of the blade and an aft sweep (positive sweep angle) away from the root region. The rate of change of the leading edge sweep angle with respect to span height and the location of the blade first height 151 on the blade leading edge 52 where the transition from forward sweep to aft sweep occurs are chosen such that the flow coming out of the stator vanes, such as for example, stator vane 40 in FIG. 4, enters the rotor blades, such as for example, blade 50 in FIG. 4, with increased efficiency and is directed towards the hub region of the rotor in a manner to increase the operability and efficiency of the rotor. As discussed previously, stall in a booster typically originates near the hub region over the higher power ranges where the booster bleed valve operates closed. Having the unique characteristics of the blade leading edge 52 described herein increases the stall margin for the booster. In the preferred embodiment of the booster, all the rotor stages have rotor blades that have substantially the same characteristic linear variation of the leading edge sweep angle with span height, as shown in FIG. 9.

Figure 10:
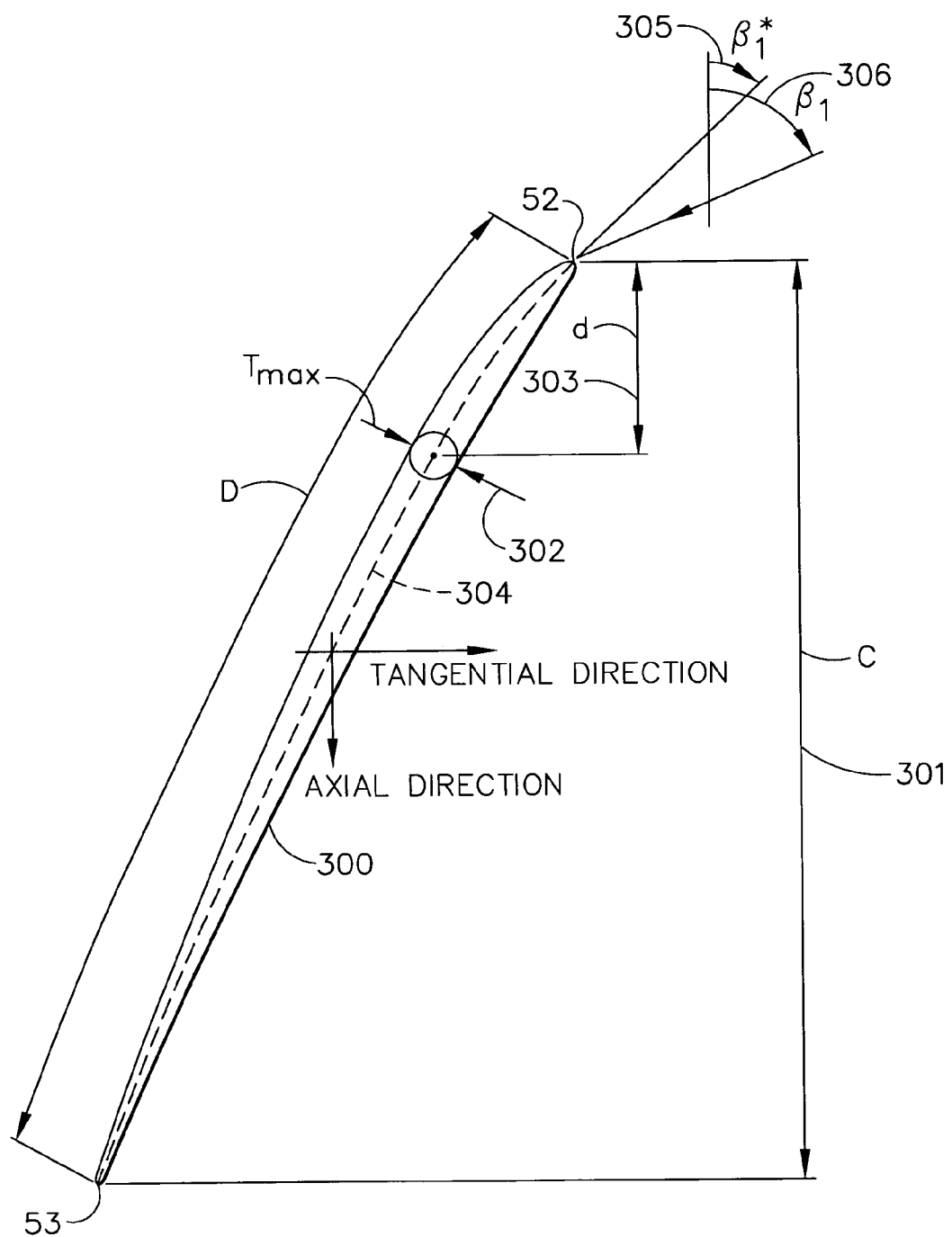
FIG. 10 is a radial sectional view through the airfoil of one of the rotor blades in a booster, showing the location of the maximum airfoil thickness.

FIG. 10 shows a radial sectional view through the airfoil of an exemplary rotor blade. In another aspect of the invention, the locations of the maximum thickness 302 (identified as "Tmax", see FIG. 10) of the rotor blade airfoil sections 300 are chosen such that they are located closer to the leading edge 52 at higher span locations from the blade root 54 and the relative distance of the Tmax location from the leading edge varies in a substantially linear manner with respect to the span height from the blade root 54 to the blade tip 55. In this context, the "relative distance" is defined as the ratio of the axial distance "d" 303 (see FIG. 10) of the Tmax location along an axial line from the blade leading edge 52 to the axial chord length "C" 301 (see FIG. 10) of the airfoil section 300 at a particular span height.

Figure 11:
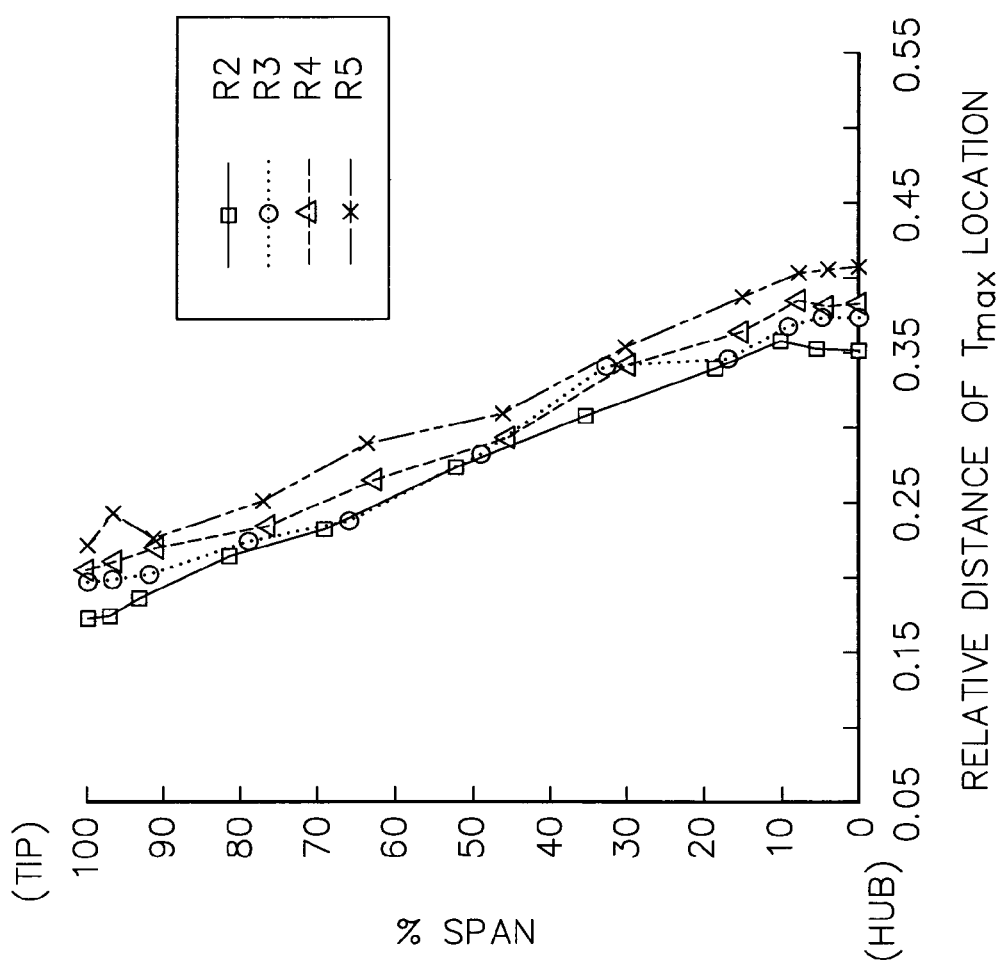
FIG. 11 is an exemplary distribution of the location of maximum airfoil thickness for airfoil sections at various span heights.

Locating Tmax 302 near the blade leading edge 52 at higher span heights from the blade root 54 results in higher wedge angles for the blade leading edge 52 in the radially outer sections of the blade airfoil. The higher wedge angles result in leading edge shapes in the outer airfoil sections which improve incidence angle range and operability of the booster, in addition to being mechanically robust. It may be noted that the characteristic of locating Tmax progressively proximate to blade leading edge in outer span regions, and designing multiple booster rotor stages such that Tmax is located relatively closer to the leading edge in the front stages than the rear stages, as shown for example in FIG. 11, are contrary to the conventional practice in the design of compression system airfoils. In conventional designs the Tmax locations of various airfoil sections are chosen based on mechanical design considerations such as blade frequencies.

A preferred embodiment of this characteristic of Tmax locations is shown in FIG. 11 for the various rotor stages of the booster system. In the preferred embodiment of the rotor blade, the relative distance is about 0.4 at the root and is about 0.2 at the tip. The variation of the relative distance with respect to the span height is substantially linear, as shown in FIG. 11. In the preferred embodiment of the booster system, the characteristic variation of the relative distance with span height is substantially the same for the rotor blade airfoils in multiple rotor stages, as shown in FIG. 11 for R2, R3, R4 and R5 rotor stages.

One of the ways the operability of the booster system is improved is by directing more flow towards the hub region, as the air traverses the axial path with large curvatures through the booster. One of the parameters of blade design which can be used influence the flow directions is the dihedral angle at a particular location. Dihedral exists, for example, when the blade surface is not normal to the hub. As used herein, the definition of "Dihedral" or, alternatively, "Dihedral Angle", is the same as that outlined in the paper "Sweep and Dihedral Effects in Axial-Flow Turbomachinery", Leroy H. Smith, Jr., and Hsuan Yeh, Journal of Basic Engineering, Transactions of ASME, 62-WA-102, 1962.

Figure 12:
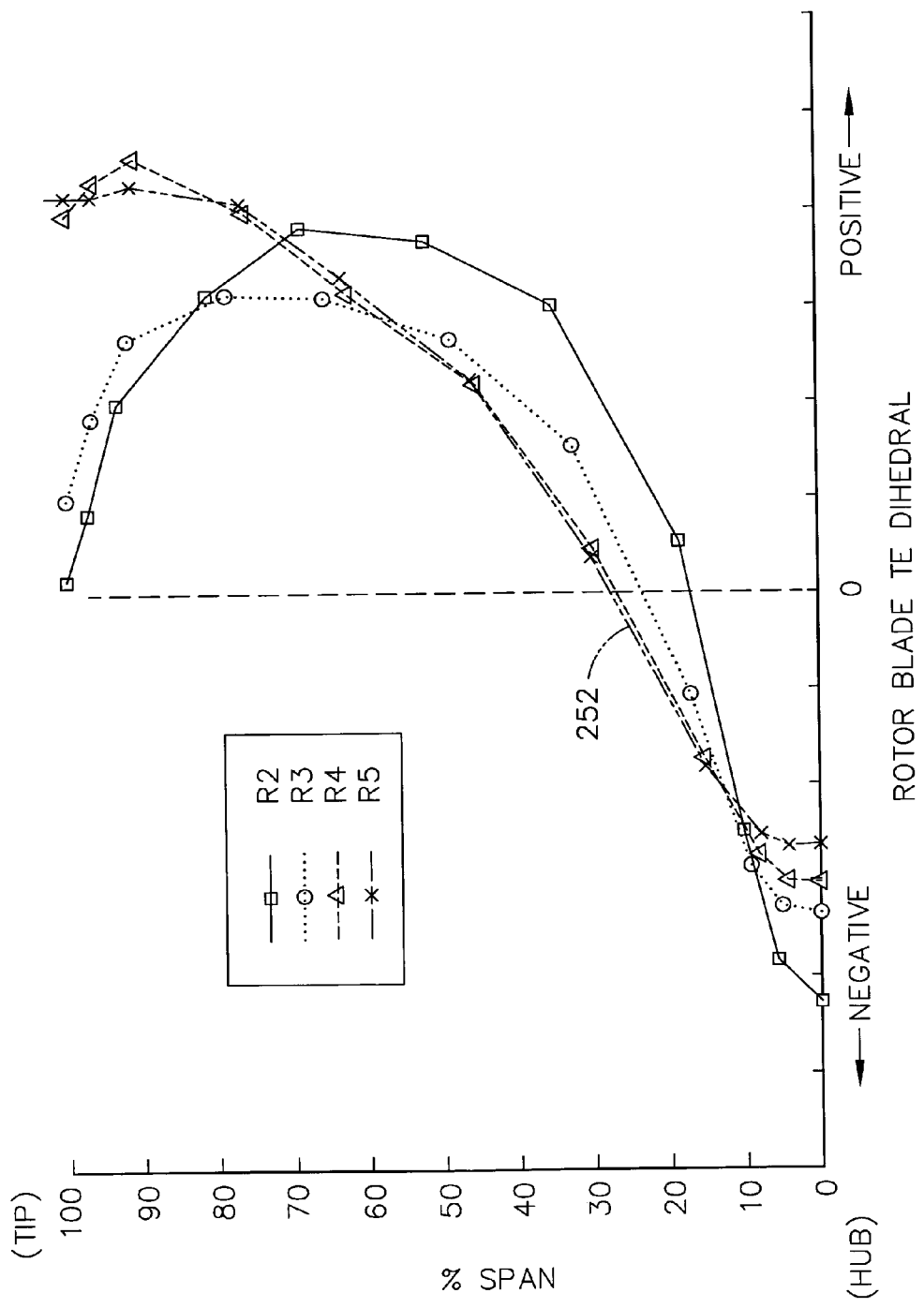
FIG. 12 is an exemplary embodiment of rotor trailing edge dihedral angle variations with span height for multiple rotor stages of a booster.

In another aspect of the invention of a new rotor blade, the performance and operability of the booster system is improved by adopting a new dihedral angle profile at the trailing edge 53 that particularly matches the new blade leading edge 52 sweep rate of change with the span height and the variation of the location 303 of the maximum airfoil thickness 302 described before. FIG. 12 shows an exemplary distribution of the dihedral angle at the trailing edge 53 of the rotor blade with respect to the span height. A negative dihedral angle at a point on the blade means that the normal to the pressure surface of the blade at that location points towards the longitudinal centerline axis 15 of the booster system. As shown in FIG. 12, the trailing edge dihedral angle is lowest at the blade root 54, adjacent to the booster hub and is negative between the blade root 54 and a second height location "H2" 152 (see FIG. 4) on the trailing edge 53. The dihedral angle becomes less negative as the span height increases, becoming positive at an intermediate span height location, thereafter reaching a maximum value, and decreasing thereafter towards the tip.

In the preferred embodiment of the rotor blade, the dihedral angle is about –15 degrees to –20 degrees at the blade root 54, and remains negative up to a span height of about 20% from the blade root 54. In the preferred embodiment of a booster system with multiple rotor stages, the trailing edges 53 of the blades in multiple rotor stages have negative dihedral angles near the hub region, from the blade root to about 20% to 30% span height.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A stator vane for a gas turbine engine comprising pressure and suction sides extending between leading and trailing edges, and longitudinally between a root and a tip, the trailing edge having an exit swirl angle distribution profile from the root to the tip such that the exit swirl angle increases between a first radius location and an intermediate radius location between the first radius location and the tip wherein the exit swirl angle has a maximum value at the intermediate radius location and wherein the exit swirl angle remains substantially constant between the intermediate radius location and the tip.

2. A stator vane according to claim 1 where the first radius location is at the root.

3. A stator vane according to claim 1 where the intermediate radius location is located at a span height of more than 50% from the root.

4. A stator vane according to claim 1 where the intermediate radius location lies at a span height of between 60% and 80% from the root.

5. A stator vane for a gas turbine engine comprising pressure and suction sides extending between leading and trailing edges, and longitudinally between a root and a tip, the trailing edge having an exit swirl angle distribution profile from the root to the tip such that the exit swirl angle increases between a first radius location and an intermediate radius location between the first radius location and the tip wherein the exit swirl angle has a maximum value at the intermediate radius location, the leading edge having forward sweep from the root to a first span location between the root and the tip, and aft sweep between the first span location and the tip and wherein the exit swirl angle remains substantially constant between the intermediate radius location and the tip.

6. A stator vane according to claim 5 where the first radius location is at the root.

7. A stator vane according to claim 5 where the intermediate radius location is located at a span height of more than 50% from the root.

8. A stator vane according to claim 5 where the intermediate radius location lies at a span height of between 60% and 80% from the root.

* * * * *